United States Patent [19]

Müller et al.

[11] 4,395,927

[45] Aug. 2, 1983

[54] HYDRAULIC REGULATING DEVICE FOR LOAD SHIFTED GEARS

[75] Inventors: Alfred Müller, Leonberg; Joseph Sauer, Schwieberdingen; Manfred Schwab, Gerlingen; Meinrad Feder, Leonberg; Achim Schreiber, Schwieberdingen, all of Fed. Rep. of Germany

[73] Assignee: Robert Bosch GmbH, Stuttgart, Fed. Rep. of Germany

[21] Appl. No.: 199,919

[22] Filed: Oct. 23, 1980

[30] Foreign Application Priority Data

Nov. 9, 1979 [DE]  Fed. Rep. of Germany ....... 2945315

[51] Int. Cl.³ ............................................. B60K 41/04
[52] U.S. Cl. .................................. 74/869; 74/752 A; 74/752 C
[58] Field of Search .......... 74/752 C, 752 A, 863-869

[56] References Cited

U.S. PATENT DOCUMENTS 4,274,307  6/1981  Iwanaga et al. .................... 74/869
4,345,489  8/1982  Muller et al. .................. 74/752 C X

FOREIGN PATENT DOCUMENTS 2658195  4/1978  Fed. Rep. of Germany .
2901151  7/1980  Fed. Rep. of Germany .

*Primary Examiner*—Leslie A. Braun
*Assistant Examiner*—Frank H. McKenzie, Jr.
*Attorney, Agent, or Firm*—Michael J. Striker

[57] ABSTRACT

The hydraulic regulating device for an automatic transmission system in motor vehicles having a plurality of hydraulic couplings, includes a single pressure build-up regulating valve and a single pressure decrease regulating valve and assigned to each coupling a solenoid operated directional control valve having its working port connected to the couplings, its pressure port connected via a switch-on reversing valve to the pressure build-up regulating valve, and its return port connected via a switch-off reversing valve to a return conduit; both reversing valves are controlled according to predetermined pressure levels on the coupling so that in the working position of the switch-on reversing valve the coupling is connected to a stable high pressure and when the coupling process is initiated by reversing the position of the directional control valve, the switch-off reversing valve connects the coupling element to the pressure decrease regulating valve.

13 Claims, 2 Drawing Figures

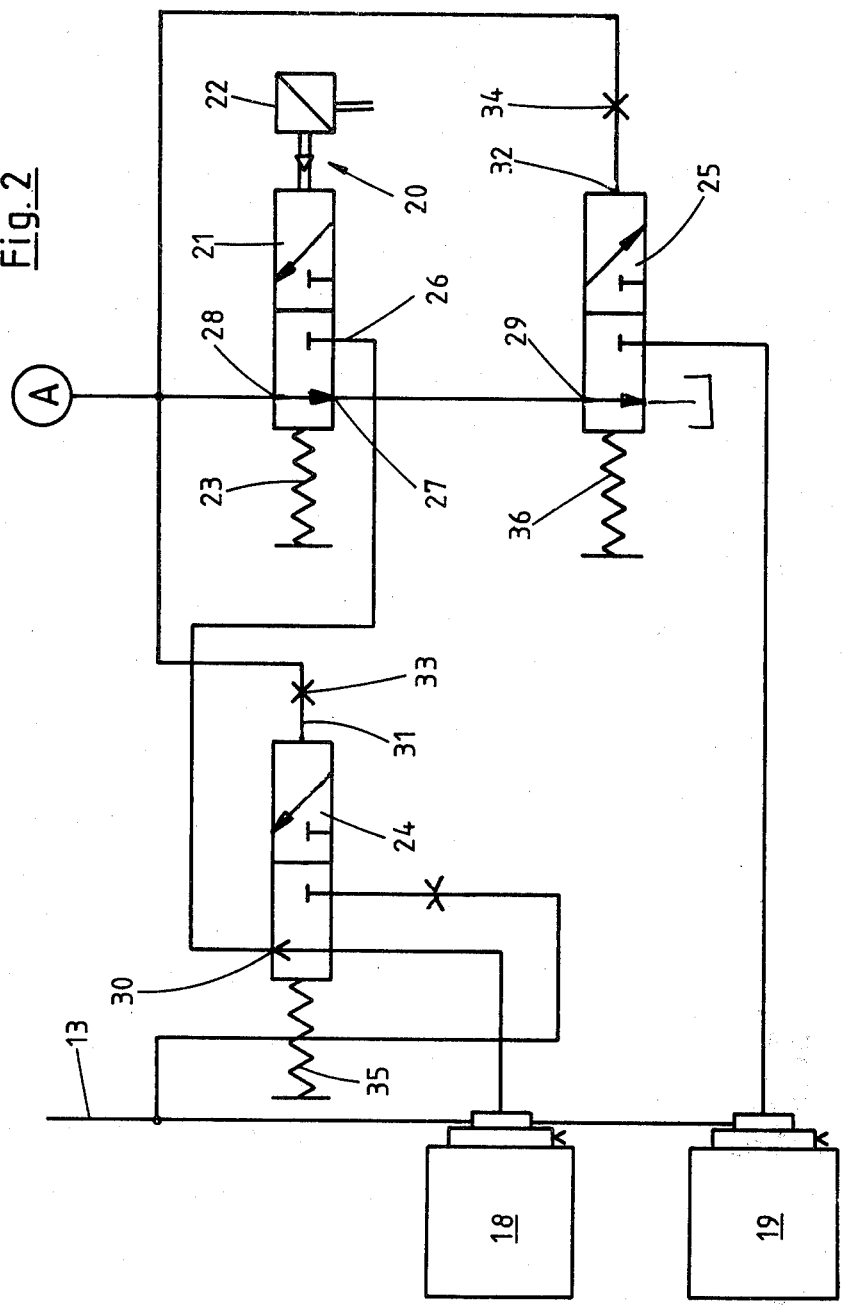

HYDRAULIC REGULATING DEVICE FOR LOAD SHIFTED GEARS

BACKGROUND OF THE INVENTION

The present invention relates in general to automatic gear changing systems and in particular to a hydraulic regulating device for load shifted gears, particularly for the automatic transmission in motor vehicles including a plurality of hydraulic coupling elements, a source of pressure fluid, a high pressure conduit connected to the source and a return conduit.

In known hydraulic regulating devices of the above described type each shifting element constituted by a hydraulic coupling of the automatic transmission cooperates with an electromagnetically operated pressure regulating valve having its regulating characteristics proportional to the applied electrical current. In this prior art device, each pressure regulating valve has its pressure port connected to the main high pressure conduit, its return port connected to the reservoir of the pressure fluid, and its working port connected to the assigned shifting element. A suitable electronic control apparatus controls respective pressure regulating valves in such a manner that the desired gear shift condition (forward gear, reverse gear, neutral) of the load shifted gear box be attained. The necessary data for carrying out the proper shift such as the load effect, the vehicle speed or the rotational rate of the engine are detected by corresponding feelers and are fed to the electronic control apparatus which processes the detected data into corresponding control signals for the individual electromagnetically activated pressure regulating valves. As mentioned above, the pressure regulating valves have a current proportional behavior, that means pressure at the output of the pressure regulating valve increases proportionally to the excitation current applied to the actuation solenoid.

This prior art hydraulic control device has the advantage that the individual shifting elements can be individually controlled and regulated by the assigned electromagnetically operated pressure regulating valve without the use of hydraulic controllers and with minimum expenditures in hydraulic circuits. Also the required feelers for sensing rotational speed or the speed of the vehicle and the load effect are simple and can be manufactured at a low cost. The disadvantage of this prior art solution, however, is the fact that the electromagnetically controlled pressure regulating valves having their regulating behavior proportional to the applied electrical current are relatively expensive and consequently the necessity to employ a large number of such pressure regulating valves almost counterbalances the aforementioned advantages.

SUMMARY OF THE INVENTION

It is therefore a general object of the present invention to overcome the aforementioned disadvantages.

More particularly, it is an object of the invention to provide an improved hydraulic regulating device of the aforementioned type which while maintaining the possibility of simple and individual regulation of the shifting elements in the transmission system, substantially reduces the number of the electromagnetically controlled pressure regulating valves.

An additional object of the invention is to substantially reduce the manufacturing cost of such a hydraulic regulating device.

In keeping with these objects, and others which will become apparent hereafter, one feature of the invention resides, in a hydraulic regulating device of the aforedescribed type, in the provision of only two electromagnetically controlled pressure regulating valves, the first being used for regulating pressure build-up and the second being used for regulating the pressure relief and a plurality of solenoid operated, three-way, two-position directional control valves assigned respectively to the corresponding hydraulic coupling elements, and flow reversing valves connected to each of the directional control valves for connecting the latter according to the activation or inactivation of the corresponding coupling element to the pressure build-up regulating valve or to the pressure decrease regulating valve whereby upon the completion of the actuation process the reversing valve disconnects the directional control valve from the pressure regulating valve.

When the hydraulic regulating device of this invention is employed in the so-called compound automatic transmission in which during the gear shifts only one shift element or hydraulic coupling is activated or inactivated or the individual shifting or coupling elements are consecutively, and not simultaneously, operated, only two electromagnetically controlled pressure regulating valves are necessary irrespective of the employed number of the shifting or coupling elements, namely the pressure regulating valve for regulating the pressure build-up and the pressure regulating valve for controlling the pressure decrease. In load shifted transmissions in which the gear shift takes place in groups, for example in the case of a 4-speed transmission where up to four shifting or coupling elements are operated simultaneously and are regulated differently one from the other, it is necessary to provide such an amount of pressure regulators for the pressure build-up and the pressure decrease that corresponds always to the number of shifting elements that are to be operated simultaneously.

In spite of the fact in the hydraulic regulating device of this invention the reduction of the number of pressure regulating valves necessitates additional directional control valves and reversing valves, lower manufacturing costs for the overall regulating device are still attained, inasmuch as the additional control and reversing valves are substantially simpler in design and less expensive in manufacture than the proportional pressure regulating valve. The directional control valves and the reversing valves have substantially the same design except for modifications in the reversing valves and are identical with pressure reducing and logic valves which are still needed in the hydraulic regulating device. In other words, for the entire hydraulic regulating device of this invention are needed only two types of valves and consequently the manufacture of the regulating device is considerably simplified.

The simplification of the manufacture is still enhanced when the directional control valve is assembled of a three-way, two-position, sliding-spool directional control valve and a two-way, two-position, solenoid control valve. Such 2/2 directional magnetically controlled valves are particularly advantageous as to their cost and sliding-spool directional control valves correspond to the aforementioned types of valves employed in the regulating device. In the hydraulic regulating device of this invention the individual shifting elements, namely the hydraulic couplings, are engaged and disengaged in a regulated manner. Accordingly, it is possible to achieve a very soft and unnoticeable gear changing operation. By means of this invention it is assured that always only a single shifting element or coupling can be actuated while the shifting elements or couplings which have been already operated are not influenced by the actuation of another shifting element or coupling.

Of particular advantage is the embodiment of the invention in which the reversing valves are designed in such a manner that the reversing valve assigned to the pressure build-up regulating valve changes its position only at the end of the pressure build-up on the assigned shifting or coupling element whereas the reversing valve assigned to the pressure decrease regulating valve changes its position at the very beginning of the pressure build-up process while during the pressure decrease the two direction reversing valves change their position in a reversed order. Preferably, the reversing valves are in the form of spring-biased hydraulically operated 3/2 directional control valves whereby the control ports are connected to the working port of the electromagnetically controlled directional control valves and to the shifting or coupling element. The biasing spring of the first-mentioned reversing valve assigned to the pressure build-up regulating valve is designed to respond to a relatively high pressure level at the shifting or coupling element, whereas the biasing spring of the second reversing valve responds to a low pressure level at the latter. By these measures it is assured that the actuation of the shifting or coupling element is completed before the reversing valves change their positions and after the position reversal the shifting or coupling element remains in stable condition until the position of the solenoid operated directional control valve is changed.

Preferably the pressure regulating valves for the build-up and decrease of pressure operate proportionally the excitation current. This current-proportional behavior enables the optimum construction of the valve and the latter can be designed with a relatively small structural volume. Both pressure regulating valves are identical except the valve for regulating the pressure build-up has to be included in the so-called emergency operational means. This emergency operational means insure a schedule according to which even in the case of failure of the electronic control apparatus for controlling the electromagnetically operated pressure regulating valve and directional control valve at least for one gear in the automatic transmission remains operative so that the car be not immobile.

It is also possible to design the pressure regulating valve to be inversely proportional to the applied electrical current. In this case, the inclusion of the pressure build-up regulating valve into the emergency operation means is no longer necessary, inasmuch as in the event of failure of the electrical control apparatus the maximum pressure is generated automatically.

The pressure build-up regulating valve that has an inversely proportional current characteristic of course, must have been designed for a higher pressure level in a particular gear and for all other gears it would be overdimensioned.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is a circuit diagram of a part of the device of FIG. 1 for actuating one shifting element.

DESCRIPTION OF THE PREFERRED EMBODIMENTS

Figure 1:
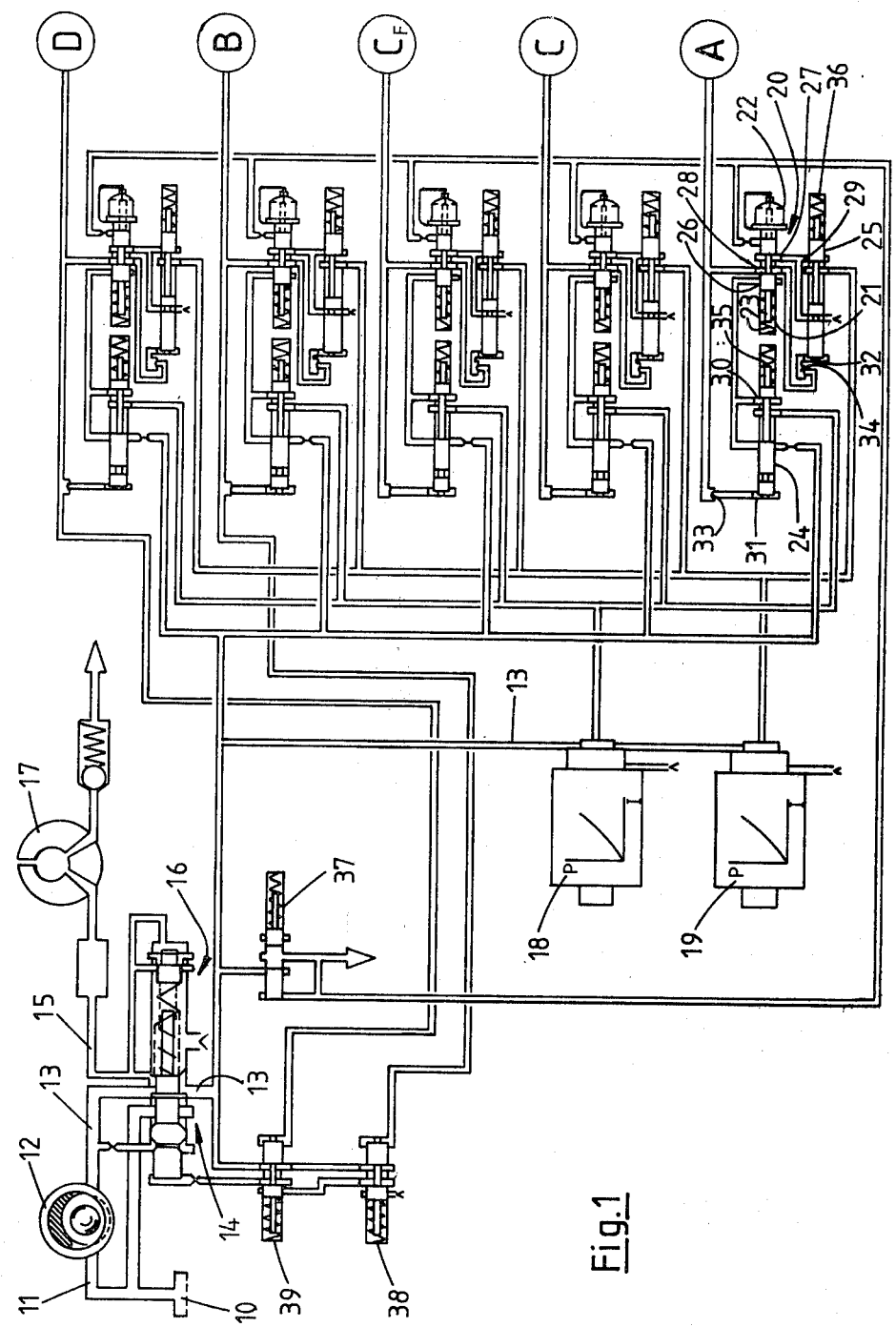
FIG. 1 is a schematic diagram of a hydraulic regulating device of this invention for use in a compound automatic transmission having five shifting elements.

The hydraulic regulating device illustrated in FIG. 1 is applicable for a compound load shifted transmission and includes five hydraulically activated shifting or coupling elements A, C, $C_F$, B and D which are activated, that means coupled or uncoupled, one after the other in different combinations according to the gear to be changed. For example, in the first gear, the coupling A is switched on or closed. In the second gear, couplings A, C and $C_F$ are activated or engaged. In the third gear the couplings A, B and $C_F$ are activated.

The hydraulic regulating device for the aforedescribed actuation of the couplings A through D includes a source of pressure fluid 10 from which pressure fluid is sucked via a suction conduit 11 into a pump 12 and therefrom into a main pressure fluid conduit 13. Pressure in the main pressure conduit 13 is controlled in dependence on the applied gear by a main pressure control valve 14. A converter supply conduit 15 leads from the main pressure control valve 14 via a pressure regulating valve 16 to a hydrodrynamic torque converter 17 wherefrom the pressure fluid is supplied to a lubrication system of the transmission. The construction and the operation of the above described part of the hydraulic regulating device of this invention is known and described for example in the German Pat. No. 26 58 195 and therefore need not be described in detail.

Working fluid in the main pressure conduit 13 is held at a constant pressure and is supplied to two electromagnetically controlled pressure regulating valves 18 and 19 which are connected to a branch of the main pressure conduit. The electromagnetically controlled regulating valves of this type are known and are described for example in the German published patent application No. 2 901 051. The pressure port of each pressure regulating valve 18 and 19 is connected to the main pressure conduit 13 and the return port which in FIG. 1 is denoted by an arrowhead is connected to the reservoir 10. The electromagnetic pressure regulating valves 18 and 19 are controlled by a non-illustrated electronic control apparatus. In this example, both pressure regulating valves 18 and 19 have substantially a current-proportional behavior, that means pressure at the working or outlet port of the respective regulating valves 18 and 19 is proportional to the applied electrical current. The first pressure regulating valve 18 serves for regulating the pressure build-up or increase on individual couplings A through D and in the following description it will be called a pressure build-up regulating valve. The second pressure regulating valve 19 serves for regulating the decrease or relief of pressure in respective couplings A through D to disengage the latter and in the following it will be described as pressure decrease regulating valve.

Each of the couplings A through D is provided with a solenoid operated directional control valve 20 having two positions and at least three control ports or connections. In the embodiment of FIG. 1 the directional control valve 20 is assembled of a 3-way, 2-position, sliding-spool directional control valve pilot or hydraulically operated by a solenoid actuated, 2-way, 2-position valve 22. Each of the directional control valves 20 is provided with a resetting spring 23.

Two reversing valves 24 and 25 are connected to respective directional control valves 20 in such a manner that by actuating or inactivating the assigned coupling element A through D, the pressure build-up regulating valve 18 or the pressure decrease regulating valve 19 is connected to the valve 20 and upon completion of the actuation or inactivation of the coupling the reversing valves are disconnected from the directional control valve. In this manner it is insured that only one of the coupling elements A through D is appropriately connected to the pressure regulating valves 18 and 19. The reversing valve 24 which in the following description is designated as a switch-on reversing valve, provides a passage between the outlet port of the pressure build-up regulating valve 18 and the inlet or pressure port of the directional control valve 20 whereupon it switches over to the main pressure conduit 13. This switch-on reversing valve 24 always connects via the directional control valve 20 the pressure build-up regulating valve 18 to an inactive or incompletely activated or deactivated coupling element A through D whereas when a coupling element is activated or engaged it connects the same via the directional control valve 20 to the main pressure conduit 13.

The reversing valve 25, in the following called switch-off reversing valve, is always connected between the pressure decrease regulating valve 19 and the directional control valve 20 and subsequently to a return conduit of the reservoir 10. The switch-off reversing valve 25 always connects an inactivated or nonactive coupling element to the return conduit whereas when the coupling is activated the valve 25 changes its switching position to connect the pressure decrease regulating valve 19 to the directional control valve 20. Both reversing valves 24 and 25 are operated in response to the actuation of the assigned directional control valve 20. The solenoid of the directional control valve 20 is activated by the aforementioned electronic control apparatus. The individual control valves 20 as mentioned already before, includes three connections or ports, namely a pressure port 26, a return port 27 and working port 28 (FIG. 2). The pressure port 26 in the rest position of the switch-on reversing valve 24 communicates with the outlet of the pressure build-up regulating valve 18 whereas in the working position of the switch-on reversing valve 24 it communicates with the main pressure conduit 13. The return port 27 of the control valve 20 in the rest position of the switch-off reversing valve 25 communicates with the reservoir 10 and in the working position of the switch-off reversing valve 25 it communicates with the outlet of the pressure release regulating valve 19. The working port 28 of the valve 20 is always connected with one of the coupling elements A through D. The directional control valves 20 when in their rest positions connect the assigned coupling elements A through D to the working port 29 of the switch-off reversing valve 25 whereas in their working positions connect the assigned couplings to the working port 30 of the switch-on reversing valve 24. Of course it is also possible to make these connections in a reversed order. In this case in order to release the coupling elements A through D an excitation current has to be applied to the directional control valve 20 and to inactivate the coupling elements A through D the current in the solenoid has to be disconnected.

The reversing valves 24 and 25 are constructed in the form of hydraulically controlled 3-way, 2-position directional control valves each having a resetting spring. The control ports 31 and 32 of respective reversing valves 24 and 25 are connected to the working port 28 of the directional control valve 20; each working port 28 is also connected to the assigned coupling element A through D and consequently the same pressure builds up on the coupling elements and on the control ports 31 and 32. Back pressure restrictors 33 and 34 are connected in conduits leading to the control ports 31 and 32. Each reversing valve 24 and 25 is provided with a resetting spring 35 and 36 each having a different strength. The strength of the resetting spring 35 is relatively large so that the valving element of the reversing valve 24 changes its position only when a relatively high pressure builds up on the assigned coupling element and thus at the control port 31. In contrast, the resetting spring 36 of the switch-off resetting valve 25 is relatively weak and the resetting spring 35 is designed to be substantially stronger. Due to the different strengths of the springs 35 and 36 and also due to the delaying effect of the back pressure restrictors 33 and 34, it is achieved that upon activation of the reversing valves 24 and 25 by the actuation of the electromagnetically controlled directional control valve 20, the switch-on reversing valve 24 changes its position at the end of the pressure build-up process performed by the pressure regulating valve 18 while the switch-off reversing valve 25 changes its position at the beginning of this pressure build-up process; when the solenoid of the directional control valve 20 is deenergized and the directional control valve 20 assumes its rest position, the switch-on reversing valve 24 returns to its rest position at the beginning of the pressure releasing process performed by the pressure regulating valve 19 whereas the switch-off reversing valve 25 returns to its starting position at the end of the pressure decreasing process. In other words, after the actuation of the valve 20 the reversing valve 25 changes its rest position into its working position before the switch-on reversing valve 24 and after the energization of the valve 20 the reversing valve 24 returns to its rest position before the reversing valve 25. In this manner it is insured during the shifting process that the coupling element to be engaged or disengaged is always connected prior to the termination of the shifting process with the pressure build-up regulating valve 18 and upon completion of the shifting process is connected to the main pressure conduit 13 and upon initiating the disengaging process of respective couplings A through D, the corresponding coupling is connected to the pressure decrease regulating valve 19 and only after the disengaging process is completed the coupling element is connected to the return conduit. At the same time it is insured that only those of the couplings A through D are connected to the pressure regulating valve 18 or 19, the directional control valves of which remain activated. The other couplings remain unaffected and cannot change their condition as long as the pressure build-up regulating valve 18 is operative to pressurize the activated coupling element or vice versa, as long as the pressure is released from this coupling element by the pressure decrease regulating valve 19.

In order to activate the directional control valve 20 constituted by the aforementioned sliding-spool, 3-way, 2-position control valves 21 and a 2-way, 2-position solenoid control valve 22, there is provided a pressure reducing valve 37 connected between the main pressure conduit 13 and the control port of the valve 22. If the directional control valves 20 are constructed as solenoid operated 3-way, 2-position control valves, the pressure releasing valve 37 as well as the control conduit to the valve 20 can be dispensed with.

For shifting a reverse gear, two couplings B and D have to be energized and the latter couplings require an increased pressure of the working fluid. For increasing the working pressure two logic valves 38 and 39 are connected to the main pressure valve 14 to adjust the latter into a control position in which a higher pressure is built up in the main pressure conduit 13. The logic valves 38 and 39 have respectively the form of simple sliding-spool control valves loaded unilaterally by a spring. Control ports of the logic valves 38 and 39 are connected to corresponding coupling elements B and D and the sliding spool of the logic valves therefore is moved in response to the pressure in the coupling elements B and D. The two logic valves 38 and 39 and their control connections to the couplings B and D can be replaced by a single 3-way, 2-position solenoid controlled valve which is connected to the main pressure valve 14 and to the main pressure conduit 13 in the same manner as the logic valves.

The operation of the above described hydraulic regulating device of this invention will be described in connection with FIG. 2 depicting in a circuit diagram part of the hydraulic device pertaining to a single coupling element A whereby the pictorial diagrams in FIG. 1 are substituted by schematic diagrams for which the switching-on and the switching-off operation of respective valves can be more clearly recognized. If the coupling element A is to be switched on, the solenoid 22 of the directional control valve 20 is energized and the sliding spool control valve 21 moves from its neutral position illustrated in FIG. 2 into its working position in which the coupling A is connected via pressure ports 26 and the switch-on reversing valve 24 to the outlet of the pressure build-up regulating valve 18. The relatively strong resetting spring 35 still keeps the reversing valve 24 in its rest position. Alternatively, the return port 27 of the valve 21 is disconnected from the return conduit leading via the second switch-off reversing valve 25 to the reservoir. The pressure build-up regulating valve 18 is now controlled by the electronic control means and starts building pressure in the coupling element A in dependence on a measured or nominal value detected by a feeler in the vehicle. The gradually increasing pressure suddenly changes the position of the switch-off reversing valve 25 because the resetting spring 36 as described above has only a negligible resetting force and the control port 32 of the valve 25 is without delay attacked by the pressure fluid via the back pressure restrictor 34. By changing its rest position into its working position, the second reversing valve 25 connects the return port of the directional control valve 21 to the second pressure regulating valve 19 and disconnects the return conduit. Upon attaining a predetermined pressure level the switch-on reversing valve 24 due to the delaying action of the back pressure restrictor 33 slowly overcomes the force of the strong resetting spring 35 and moves the sliding spool of the valve 24 from its rest position into its working position. As it can be seen from the construction of the switch-on reversing valve 24 in FIG. 1, during the movement of the sliding spool the connection between the first pressure regulating valve 18 and the coupling element A is maintained and only at the end of the position reversing process when the sliding spool of the reversing valve 24 has fully attained its working position this connection is cut off. In this working position of the switch-on reversing valve 24, the coupling element A is disconnected from the pressure build-up actuating valve 18 and connected to the main pressure conduit 13. As a result, the pressure from the conduit 13 attacks both control ports 31 and 32 of respective reversing valves 24 and 25 and consequently holds automatically the latter valves in their working positions. At the same time, the pressure at the outlet of the pressure build-up regulating valve 18 can be lowered to zero so as to enable a new pressure building-up process for another of the coupling elements B through D. The activated or engaged coupling element A remains during the subsequent pressure building or shifting process at another of the couplings B through D ineffective inasmuch as it is uncoupled from the pressure regulating valve 18 and directly connected to the main pressure conduit 13.

If it is now desired to uncouple or disengage the coupling element A, the electronic control apparatus deenergizes the solenoid of the directional control valve whereby the resetting spring 23 displaces the sliding spool of the valve 21 from its working position into its rest position according to FIG. 2. Since both reversing valves 24 and 25 remain in their working positions, the coupling A is now directly connected via the valve 21 and the valve 25 to the pressure decrease regulating valve 19 while the connection to the main pressure conduit 13 is interrupted. The pressure decrease regulating valve 19 is now controlled by the electronic controlling means to decrease pressure in coupling element A according to a predetermined value. The gradually decreasing pressure of working fluid in coupling A flows freely through the back pressure restrictors 33 and 34 into the control ports 31 and 32 of the reversing valves 24 and 25. Due to the superior force of the resetting spring 35, the reversing valve 24 returns quickly into its rest position while the weak resetting spring 36 of the second reversing valve 25 is still held compressed so that the sliding spool of the valve 25 remains in its working position to the end of the decoupling process when the pressure level at the coupling A drops below the small force of the resetting spring 36 and the sliding spool of the valve 25 due to the delaying action of back pressure restrictors 34 slowly returns into its rest position. The spring 36 and the restrictor 34 are dimensioned such that the sliding spool of the reversing valve 25 starts moving at a certain level of pressure whereby the configuration of the recessed passages in the sliding spool maintains the connection between the coupling element A and the pressure decrease regulating valve 19 so long until the reversing valve 25 fully reassumes its rest position as illustrated in FIG. 2. The sudden switching action of the reversing valves 24 and 25 has the advantage that the volume of the displaced fluid is relatively small. As soon as the switch-off reversing valve 25 has attained its rest position, the coupling element A is again connected to the return conduit.

In this example both pressure regulating valves 18 and 19 have regulating characteristics proportional to the excitation electrical current. This feature has the advantage that both pressure regulators 18 and 19 have identical structure and optimum size. Of course it is necessary that the pressure build-up regulating valve 18 be connected into an emergency drive means described in the aforementioned German published patent application No. 2 901 051. The emergency drive means insure that in the event of failure of the electronic control apparatus a pressure is still available for shifting one gear in the load shifted transmission that still enables the motor vehicle a certain degree of mobility. Nevertheless it is also possible to design the pressure regulating valve 18 to be inversely proportional to the excitation electrical current. In this case, when the electronic control fails, the maximum pressure is automatically established and consequently the emergency drive means are no longer necessary. On the other hand, this inverse pressure regulator 18 has to be designed for a higher pressure level in a certain gear and therefore for the remaining gears it would be overdimensioned.

The hydraulic regulating device of this invention is suitable particularly for the so-called compound automatic transmission in which the individual shifting or coupling elements A, B, C, $C_F$ and D are activated separately or in consecutive time periods. The hydraulic regulating device of this invention however is also applicable for semi-automatic transmissions with shifting in groups wherein for example 4-speed gears are simultaneously coupled to four shifting or coupling elements and each has to be regulated in a different manner. In this case the number of the pressure regulating valves has to be correspondingly increased. According to the number of the shifting or coupling elements which are operated simultaneously, a corresponding number of pressure build-up and pressure decrease regulating valves 18 and 19 is necessary. The pressure build-up regulating valve 18 and a pressure decrease regulating valve 19 with corresponding directional control valves 20 and reversing control valves 24 and 25 are to be assigned to those coupling or shifting elements which are operated simultaneously.

It will be understood that each of the elements described above, or two or more together, may also find a useful application in other types of constructions differing from the types described above.

While the invention has been illustrated and described as embodiment in an automatic regulating device for use in compound automatic transmissions, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hydraulic regulating device for a load shifted gear system, particularly for an automatic transmission system in motor vehicles, including a plurality of hydraulic coupling elements, a return conduit, and a pressure source connected to a high pressure conduit, said regulating device comprising a first pressure regulating valve operable for building up pressure according to a control signal; a second pressure regulating valve for decreasing pressure according to another control signal; and a three-way, two-position control valve combination assigned to each coupling element and including a solenoid operated directional control valve, a switch-on reversing valve connected between the first pressure regulating valve and the directional control valve and being activated in response to a predetermined high pressure level on said assigned coupling element to switch over the connection from said first pressure regulating valve to said high pressure conduit, and a switch-off reversing valve connected between said directional control valve and said second pressure regulating valve, said switch-off reversing valve being activated in response to a predetermined low pressure level on said assigned coupling element to connect said directional control valve from a return conduit to said second pressure regulating valve.

2. A hydraulic regulating device as defined in claim 1 wherein said directional control valve has a working port connected to said assigned coupling element, a pressure port and a return port, said switch-on reversing valve being normally in a rest position in which it connects said first pressure regulating valve to said pressure port and upon actuation in response to a predetermined high pressure level at said assigned coupling element it switches over to a working position in which it connects said high pressure conduit to said pressure port; and said switch-off reversing valve being normally in a rest position in which it connects said return port to said return conduit and being displaceable by a relatively low pressure level at said assigned coupling element to assume a working position in which it connects said return port to said second pressure regulating valve.

3. A hydraulic regulating device as defined in claim 2 wherein each of said reversing valves is a two-position valve defining a working port whereby the working port of said switch-on reversing valve is connected to said pressure port and the working port of said switch-off reversing valve is connected to said return port of the directional control valve.

4. A hydraulic regulating device as defined in claim 3 wherein each of said reversing valves has a control port connected via back pressure restricting means to said assigned coupling element.

5. A hydraulic regulating device as defined in claim 4 wherein each of said reversing valves includes a sliding spool defining a recessed passage dimensioned such that the switch-on reversing valve switches over the assigned coupling element to said high pressure conduit at the end of the pressure build-up process while maintaining the connection with said first pressure regulating valve during the movement of its sliding spool; and said switch-off reversing valve connects said return port to said return conduit at the end of the pressure decreasing process and maintains during the movement of its sliding spool the connection between said second pressure regulating valve and said return port.

6. A regulating device as defined in claim 5 wherein each of said reversing valves is a three-way, two-position valve hydraulically controlled from said control ports at one end of their control spools and being shifted in their respective rest positions by resetting springs.

7. A hydraulic regulating device as defined in claim 6 wherein the resetting spring of said switch-on reversing valve is substantially stronger than the resetting spring of said switch-off reversing valve thus permitting the switching operation of the reversing valves at different pressure levels at said coupling element.

8. A hydraulic regulating device as defined in claim 7 wherein said back pressure restricting means includes pressure restricting apertures formed in the control ports of respective reversing valves.

9. A hydraulic regulating device as defined in claim 7 wherein said directional control valve is constituted by a three-way, two-position sliding spool valve cooperating with a two-way, two-position solenoid controlled valve.

10. A hydraulic regulating device as defined in claim 8 wherein said directional control valve is constituted by a single three-way, two-position, solenoid operated directional control valve.

11. A hydraulic regulating device as defined in claim 1 wherein said coupling elements are divided in simultaneously operated groups and said first and second pressure regulating valves being assigned to each simultaneously operated group and connected to said groups by said solenoid operated valve combination.

12. A hydraulic regulating device as defined in claim 1 wherein said pressure regulating valves are controlled electrically in direct proportion to the applied electrical control signals.

13. A hydraulic regulating device as defined in claim 1 wherein said pressure regulating valves are controlled electrically in an inverse proportion to the applied electrical signal.

* * * * *